Patented June 6, 1950

2,510,088

UNITED STATES PATENT OFFICE 2,510,088

1,4-DIAMINOANTHRAQUINONE COMPOUNDS CONTAINING A CYANO GROUP IN THE 2-POSITION

Joseph B. Dickey and Anthony Loria, Rochester, N. Y., assignors to Eastman Kodak Company, Rochester, N. Y., a corporation of New Jersey No Drawing. Application November 1, 1947, Serial No. 783,623

6 Claims. (Cl. 260—380)

This invention relates to new anthraquinone compounds; their application to the art of dyeing or coloring textile materials comprising cellulose carboxylic ester fibers, in which ester the acid radical contains from 2 to 4 carbon atoms and to the preparation of the new anthraquinone compounds of the invention.

Anthraquinone compounds having the general formula

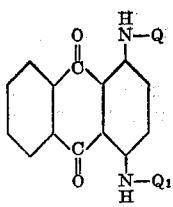

wherein Q stands for a group such as the methyl group, the ethyl group, the propyl group, the isopropyl group, the n-butyl group, the β-hydroxyethyl group, the β,γ-dihydroxypropyl group, the phenyl group, or the p-tolyl group and $Q_1$ stands for a group such as the methyl group, the ethyl group, the β-hydroxyethyl group, the β,γ-dihydroxypropyl group, the phenyl group, or the p-tolyl group are known, and all or practically all of the possible compounds having the above formula have been tested as dyes for cellulose acetate textile materials. However, while certain of these compounds were regarded as good dyes for cellulose acetate textile materials when initially tested for this purpose, they are not as highly regarded as they once were. Specifically, when employed for the dyeing of cellulose acetate textile materials, these compounds leave much to be desired with respect to one or more of the dyeing properties enumerated hereinafter, i. e., the fastness of the dyed material to light, the fastness of the dyed material to gas and the affinity of the dye for the textile material. Accordingly, much time and effort has been directed to the preparation of dyestuffs which will really satisfactorily color cellulose carboxylic ester fibers of the above character.

It is an object of our invention to provide new anthraquinone compounds which possess good affinity for cellulose carboxylic ester textile materials, in which ester the acid radical contains from 2 to 4 carbon atoms, and which yield dyeings on these textile materials which have good fastness to light and gas. A further object is to provide a satisfactory process for preparing our new anthraquinone compounds. Another object is to provide new anthraquinone compounds which are superior to the known anthraquinone compounds mentioned hereinbefore for the dyeing of cellulose acetate textile materials.

A still further object is to provide dyed cellulose carboxylic ester textile materials of the character defined herein, which possess good fastness to light and gas. Other objects will appear hereinafter.

The new compounds of our invention by means of which the above objects are accomplished or made possible have the general formula:

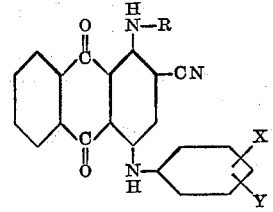

wherein R stands for a hydrogen atom, an alkyl group having one to four, inclusive, carbon atoms, a hydroxyalkyl group having two to three, inclusive, carbon atoms, an alkoxyalkyl group having three to four, inclusive, carbon atoms, and a monohydroxyalkoxyalkyl group having four to six, inclusive, carbon atoms, Y represents an $—OR_1—(OR_1)_n—OH$ group and an $$—(OR_2)_m—OR_3$$

group wherein $R_1$ and $R_2$ each represent an ethylene group, a propylene group, or a trimethylene group, $R_3$ represents a methyl group or an ethyl group, $n$ stands for a whole positive integer of from one to three, inclusive, $m$ stands for a whole positive integer of from two to three, inclusive, and wherein $n$ is three $R_1$ is ethylene, and X represents a hydrogen atom, a halogen atom, a methyl group, an ethyl group, a hydroxy group, or an acetamino group.

The range of colors of cellulose carboxylic ester textiles dyed with the anthraquinone compounds of our invention extends from bluish-green to greenish-blue shades. Silk, wool, and nylon textile materials may also be colored with the dyes of our invention.

The anthraquinone compounds of our invention are prepared by reacting an anthraquinone compound having the formula:

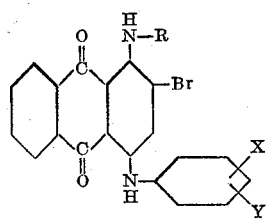

wherein R, X, and Y have the meanings previously assigned to them with cuprous cyanide in the presence of quinoline. The reaction may be carried out by heating under reflux at atmospheric pressure or by heating in a sealed autoclave. After the reaction mixture resulting from heating together the aforesaid materials has cooled, the desired anthraquinone dye is recovered therefrom in any suitable manner. In one embodiment of our invention we pour the reaction mixture into dilute hydrochloric acid, and after a short digestion at about 70° C. to dissolve the copper salts which are present we cool the reaction mixture and recover the precipitated dye by filtration. In another embodiment of the invention we filter the boiling quinoline solution to remove the copper salts and the resulting clear solution is cooled to crystallize the dye which is then recovered by filtration. The resulting filtrate may be concentrated under reduced pressure in order to obtain from a second crystallization an additional yield of dye compound. The first procedure for recovering the dye from the reaction mixture ordinarily gives higher yields.

The following examples illustrate the anthraquinone compounds of our invention and the manner in which they are prepared.

*Example 1. — 1-amino-2-cyano-4-(para-β-hydroxy - β - ethoxy-β-ethoxy-β-ethoxy-phenyl) aminoanthraquinone*

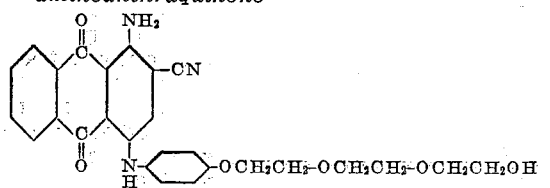

6.5 grams of 1-amino-2-bromo-4-(para-β-hydroxy-β-ethoxy-β-ethoxyethoxyphenyl)-aminoanthraquinone, 1.2 grams of cuprous cyanide and 50 grams of dry quinoline are heated under reflux with stirring for approximately one hour. The reaction mixture is allowed to cool to 40° C. to 50° C. whereupon it is poured with stirring into 230 cc. of 9% hydrochloric acid. The suspension resulting is heated at 70° C. for 30 minutes and then allowed to cool to room temperature. The desired dye compound which precipitates is collected by suction filtration, washed free of acid with dilute sodium carbonate and then cold water, and dried. It colors cellulose acetate greenish-blue shades having excellent light- and gas-fastness properties.

*Example 2.—1-amino-2-cyano-4-(p-β-hydroxy-β - ethoxy - β - ethoxy-β-ethoxyethoxyphenyl) aminoanthraquinone*

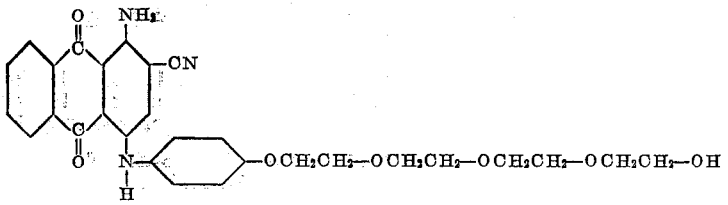

5.8 grams of 1-amino-2-bromo-4-(p-β-hydroxy - β - ethoxy - β - ethoxy-β-ethoxyethoxyphenyl) aminoanthraquinone, 1 gram of cuprous cyanide, and 50 cc. of quinoline are heated under reflux with stirring for approximately one hour. The reaction mixture is allowed to cool to 40° to 50° C. at which point it is poured into an excess of dilute hydrochloric acid. The resulting slurry is heated at 70° C. for 30 minutes and when cool the desired dye compound is recovered by filtration, washed with water, and dried. The dye colors cellulose acetate deep greenish-blue shades having very good fastness properties.

*Example 3.—1-amino-2-cyano-4-(p-γ-hydroxy-γ-propoxy-γ-propoxypropoxyphenyl) aminoanthraquinone*

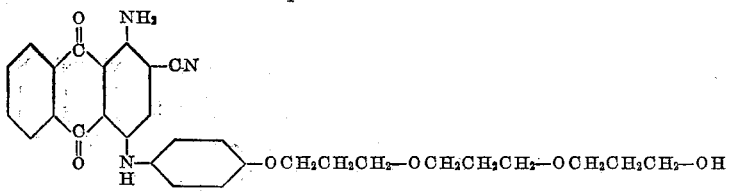

5.8 grams of 1-amino-2-bromo-4-(p-γ-hydroxy-γ-propoxy-γ-propoxypropoxyphenyl) aminoanthraquinone, 1 gram of cuprous cyanide, and 50 cc. of quinoline are heated under reflux for three to four hours. The boiling solution is filtered hot and allowed to cool. The precipitate which forms is recovered by filtration and the filtrate is concentrated by distillation under reduced pressure to a point where on cooling a further crop of crystals forms. These crystals are collected and added to the first yield and the total is washed with water and dried. The resulting dye compound colors cellulose acetate fast greenish-blue shades.

*Example 4.—1-methylamino-2-cyano-4-(para-γ-hyroxy - γ-propoxy-γ-propoxypropoxyphenyl) - aminoanthraquinone*

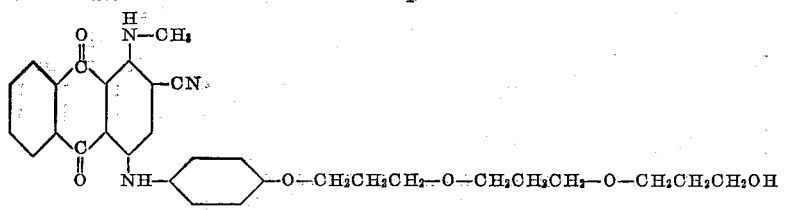

6.0 grams of 1-methylamino-2-bromo-4-(para-γ-hydroxy-γ-propoxy-γ-propoxypropoxyphenyl) aminoanthraquinone, 1 gram of cuprous cyanide, and 50 cc. of quinoline are reacted together and worked up in accordance with the procedure described in Example 1. The resulting dye compound colors cellulose acetate bluish-green shades.

*Example 5.—1-β-methoxyethylamino-2-cyano-4 - (p - β - hydroxy-β-ethoxy-β-ethoxyethoxyphenyl) aminoanthraquinone*

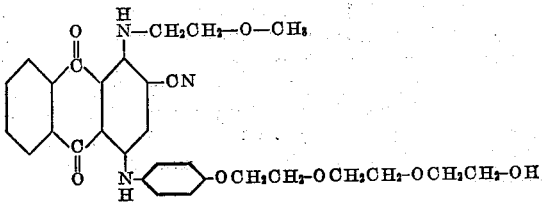

6.0 grams of 1-β-methoxyethylamino-2-bromo-4 - (p - β - hydroxy - β - ethoxy-β-ethoxyethoxyphenyl) aminoanthraquinone, 1 gram of cuprous cyanide, and 50 cc. of quinoline are reacted together and worked up in accordance with the procedure described in Example 1. The resulting dye compound colors cellulose acetate bluish-green shades.

*Example 6.—1-β-(β-hydroxyethoxy)ethylamino-2-cyano-4-(ortho-methyl-para - β - ethoxy-β-ethoxyethoxyphenyl)-aminoanthraquinone*

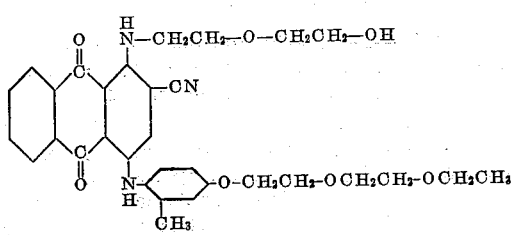

6.4 grams of 1 - β - (β-hydroxy-ethoxy)ethylamino-2 - bromo - 4 - (ortho - methyl - para-β-ethoxy - β - ethoxyethoxyphenyl) aminoanthraquinone, 1 gram of cuprous cyanide, and 50 cc. of quinoline are reacted together and worked up in accordance with the procedure described in Example 3. The resulting dye compound colors cellulose acetate bluish-green shades.

*Example 7.—1-β-hydroxyethylamino-2-cyano-4-(p-β-hydroxy-β-ethoxy-β-ethoxy - β - ethoxyethoxyphenyl) aminoanthraquinone*

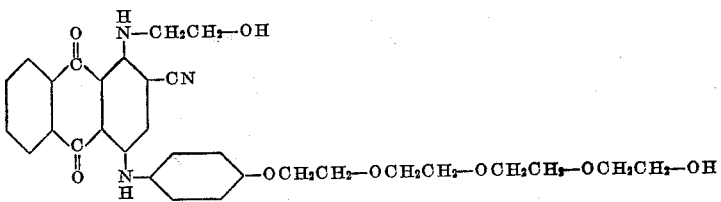

6.3 grams of 1-β-hydroxyethylamino-2-bromo-4-(p-β-hydroxy-β-ethoxy-β-ethoxy - β - ethoxyethoxyphenyl) aminoanthraquinone, 1 gram of cuprous cyanide, and 50 cc. of quinoline are reacted together and worked up in accordance with the procedure described in Example 1. The resulting dye compound colors cellulose acetate bluish-green shades.

*Example 8.—1-amino-2-cyano-4-(p-β-methoxy-β - ethoxy - β - ethoxyethoxyphenyl) aminoanthraquinone*

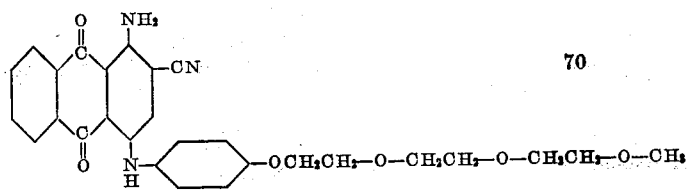

5.5 grams of 1-amino-2-bromo-4-(p-β-methoxy-β-ethoxy - β - ethoxyethoxyphenyl) aminoanthraquinone, 1 gram of cuprous cyanide, and 50 cc. of quinoline are reacted together and worked up in accordance with the procedure described in Example 1. The resulting dye compound colors cellulose acetate greenish-blue shades.

*Example 9.—1 - butylamino-2-cyano-4-(p-β-hydroxy - β - ethoxy - β - ethoxyethoxyphenyl) aminoanthraquinone*

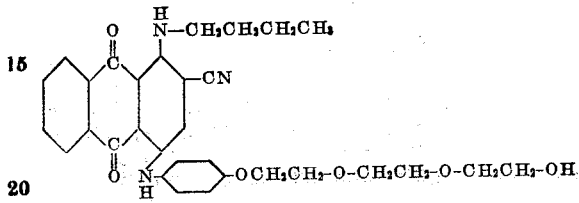

6.0 grams of 1-butylamino-2-bromo - 4 - (p-β-hydroxy-β-ethoxy-β-ethoxyethoxyphenyl) aminoanthraquinone, 1 gram of cuprous cyanide, and 50 cc. of quinoline are reacted together and worked up in accordance with the procedure described in Example 1. The resulting dye compound colors cellulose acetate bluish-green shades.

*Example 10.—1-amino-2-cyano-4-(para - β - hydroxy - β - ethoxyethoxyphenyl) aminoanthraquinone*

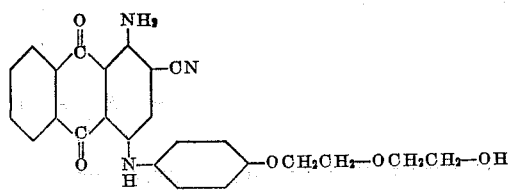

5.0 grams of 1-amino-2-bromo-4-(para-β-hydroxy - β-ethoxyethoxyphenyl) aminoanthraquinone, 1 gram of cuprous cyanide, and 50 cc. of quinoline are heated under reflux for three to four hours. The boiling solution is filtered hot and allowed to cool. The blue dye crystals which separate are recovered by filtration, and the filtrate is concentrated under reduced pressure to a point where on cooling a further crop of crystals forms. These crystals are collected and added to the first yield, and the total is washed with water and dried. The dye compound thus obtained colors cellulose acetate greenish-blue shades.

*Example 11.—1-tertiary-butylamino-2-cyano-4-(ortho-acetamino-para -γ - hydroxy - γ - propoxypropoxyphenyl) aminoanthraquinone*

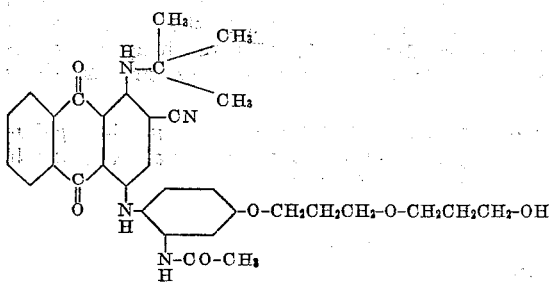

6.4 grams of 1-tertiary-butylamino-2-chloro-4-(ortho-acetamino-para-γ-hydroxy-γ-propoxypropoxyphenyl) aminoanthraquinone, 1 gram of cuprous cyanide, and 50 cc. of quinoline are placed in a shaking autoclave and heated at 250° C. for ten hours. The dye product of the reaction is removed from the autoclave and worked up in accordance with the procedure described in Example 3. It colors cellulose acetate bluish-green shades.

*Example 12.—1 - β,γ - dihydroxypropylamino-2-cyano - 4-(p-β-hydroxy - β - propoxypropoxyphenyl) aminoanthraquinone*

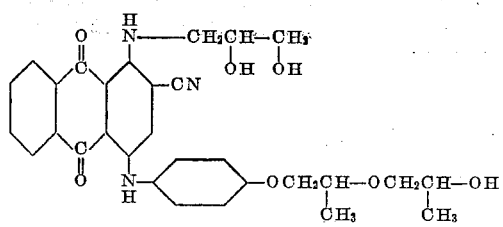

6.0 grams of 1-β,γ-dihydroxypropylamino-2-bromo-4 - (p - β - hydroxy-β-propoxypropoxyphenyl) aminoanthraquinone, 1 gram of cuprous iodide, and 50 cc. of quinoline are reacted together and worked up in accordance with the procedure described in Example 3. The resulting dye compound formulated above colors cellulose acetate bluish-green shades.

*Example 13.—1-amino-2-cyano-4-(p - β - methoxy - β - ethoxyethoxyphenyl) aminoanthraquinone*

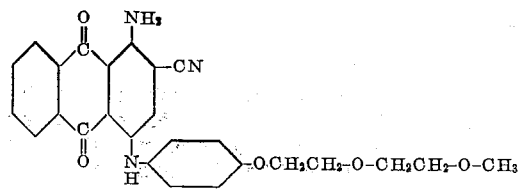

5.1 grams of 1-amino-2-bromo-4-(p-β-methoxy - β - ethoxyethoxyphenyl aminoanthraquinone, 1 gram of cuprous cyanide, and 50 grams of quinoline are heated under reflux with stirring for approximately one hour. The reaction mixture is then cooled to 40° C. to 50° C. whereupon it is poured with stirring into 230 cc. of 9% hydrochloric acid. The suspension resulting is heated at 70° C. for 30 minutes and then cooled to room temperature. A good yield of the desired dye compound precipitates and is collected by filtration, washed free of acid with dilute sodium carbonate and then cold water, and dried. It colors cellulose acetate greenish-blue shades of excellent light- and gas-fastness.

*Example 14.—1-β-ethoxyethylamino-2-cyano-4-(o - chloro - p - β-methoxy-β-ethoxy-β-ethoxyethoxyphenyl) aminoanthraquinone*

6.6 grams of 1-β-ethoxyethylamino-2-bromo-4 - (o - chloro - p -β-methoxy-β-ethoxy-β-ethoxyethoxyphenyl) aminoanthraquinone, 1 gram of cuprous cyanide, and 50 cc. of quinoline are reacted together and worked up in accordance with the procedure of Example 1. The dye compound obtained colors cellulose acetate bluish-green shades.

*Example 15.—1 - γ - hydroxy - γ-propoxypropylamino - 2 - cyano-4-(o-hydroxy-p-β-ethoxy-β-ethoxy-β-ethoxyethoxyphenyl) aminoanthraquinone*

7.0 grams of 1-γ-hydroxy-γ-propoxypropylamino - 2 - bromo - 4 -(o-hydroxy-p-β-ethoxy-β-ethoxy-β-ethoxyethoxyphenyl) aminoanthraquinone, 1 gram of cuprous cyanide, and 50 cc. of quinoline are reacted together and worked up in accordance with the procedure described in Example 1. The resulting dye compound colors cellulose acetate greenish-blue shades.

*Example 16.—1-γ-methoxypropylamino-2-cyano-4 - (o - ethyl -p-β-hydroxy-β-ethoxy-β-ethoxyethoxyphenyl) aminoanthraquinone*

6.4 grams of 1-γ-methoxypropylamino-2-bromo - 4 - (o - ethyl -p-β-hydroxy-β-ethoxy-β-ethoxyethoxyphenyl) aminoanthraquinone, 1 gram of cuprous cyanide, and 50 cc. of quinoline are reacted together and worked up in accordance with the procedure described in Example 1. The resulting dye compound colors cellulose acetate bluish-green shades.

In order that the preparation of the compounds of our invention may be entirely clear the preparation of various intermediate compounds used in their manufacture is described hereinafter.

The preparation of the 1,4-diamino-2-bromoanthraquinone compounds having the general formula:

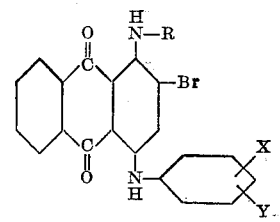

wherein R, X, and Y have the meaning previously assigned is described in the copending U. S. patent application Serial Number 731,424 of J. B. Dickey, A. Loria, and E. B. Towne, now Patent No. 2,487,045. Anthraquinone compounds of the general formula:

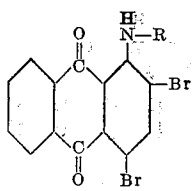

wherein R has the meaning previously assigned to it are reacted with an amine having the formula:

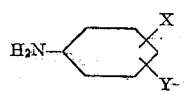

wherein X and Y have the meanings previously given to them. The reaction is ordinarily carried out in the presence of an inert organic diluent such as n-amyl alcohol, n-butyl alcohol or isopropyl alcohol and a copper salt catalyst such as finely powdered cupric sulfate or cupric acetate. The use of n-amyl alcohol has been found to be advantageous. Ordinarily an acid binding agent such as potassium acetate, sodium acetate, ammonium acetate, sodium bicarbonate, potassium bicarbonate, sodium carbonate, or potassium carbonate, for example, is also present.

The following examples illustrate the manner of preparation of these compounds.

*Example A.*—1-amino-2-bromo-4-(p-β-hydroxy-β-ethoxy-β-ethoxy-β-ethoxyethoxyphenyl) aminoanthraquinone 38 grams of 1-amino-2,4-dibromoanthraquinone, 28.5 grams of p-β-hydroxy-β-ethoxy-β-ethoxy-β-ethoxyethoxyaniline, 10 grams of potassium acetate and 1 gram of finely powdered copper sulfate ($CuSO_4 \cdot 5H_2O$) are heated together under reflux with stirring, in 150 cc. of n-amyl alcohol for seven hours. The desired compound is isolated and purified by either of the following methods:

METHOD I

The reaction mixture is taken to dryness in vacuo on a steam bath. 250 grams of toluene are added, the reaction mixture heated to boiling, filtered hot, and the insoluble material washed with 50 grams of boiling toluene. The filtrate is cooled to 15° C. and 80 grams of petroleum ether are added over a five minute period with good stirring, cooling is continued until the temperature is 0–5° C., and after one hour the compound is solid. The procedure may be repeated without decreasing the yield to any extent and should be repeated if the product is gummy at this point. If the precipitation procedure is to be repeated, the compound should be first heated to 50° C. for a few minutes to remove any residual petroleum ether that will hinder the solubility of the compound in toluene. The compound is recovered by filtration, washed with 50 grams of petroleum ether and dried at 40–50° C.

METHOD II

The reaction mixture is filtered hot, the filtrate allowed to cool slowly overnight and filtered. (The filtrate is worked up as described below.) The desired product is collected on the filter in excellent purity. It is washed with 100 cc. of petroleum ether and dried at 40–50° C.

The filtrate obtained above is treated just as the reaction mixture in Method I, using half the volume of solvents.

*Example B.*—1-amino-2-bromo-4-(para-β-hydroxy-β-ethoxy-β-ethoxyethoxyphenyl) aminoanthraquinone 38.1 grams of 1-amino-2,4-dibromoanthraquinone, 30.6 grams of para-β-hydroxy-β-ethoxy-β-ethoxyethoxyaniline, 10 grams of potassium acetate, and 1 gram of finely divided copper sulfate ($CuSO_4 \cdot 5H_2O$) are heated together under reflux with stirring in 150 cc. of n-amyl alcohol for seven hours. The resulting compound is isolated and purified by Method I or Method II.

*Example C.*—1-methylamino-2-bromo-4-(p-γ-hydroxy-γ-propoxy-γ-propoxypropoxyphenyl) aminoanthraquinone 39.5 grams of 1-methylamino-2,4-dibromo-anthraquinone, 28.3 grams of p-γ-hydroxy-γ-propoxy-γ-propoxypropoxyaniline, 10 grams of potassium acetate, and 1 gram of finely powdered copper sulfate are heated together under reflux with stirring in 150 cc. of n-amyl alcohol for seven hours. The resulting compound is isolated and purified according to the procedure of Method I or Method II.

Equivalent amounts of any of the anthraquinone compounds having the formula:

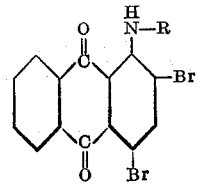

wherein R has the meaning previously assigned to it may be substituted for the 1-amino-2,4-dibromoanthraquinone of Example A. And equivalent amounts of any of the aniline derivatives having the formula:

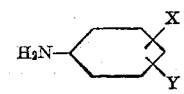

wherein X and Y have the meanings previously assigned to them may be substituted for the p-β-hydroxy-β-ethoxy-β-ethoxy-β-ethoxyethoxyaniline of Example A. In this manner any of the anthraquinone compounds from which the compounds of our invention are prepared may be conveniently made.

The preparation of aniline derivatives having the formula:

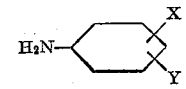

wherein X and Y have the meanings previously assigned to them has been described before, for example, in U. S. Patent 2,391,011, issued December 18, 1945, to J. B. Dickey and J. R. Byers, Jr. A compound having the formula:

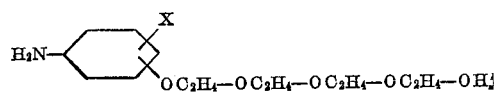

(wherein X has the meaning previously assigned to it) which is not within the scope of this reference is prepared by reacting equimolar portions of sodium and tetraethylene glycol and then condensing the sodium alcoholate formed with the desired chloronitrobenzene compound. The condensation is advantageously carried out at 90° to 100° C. for about twenty hours. The nitro compound formed is then reduced with hydrogen in the presence of a nickel catalyst, especially of the Raney type, in methanol, at 80° to 100° C. in an autoclave under a hydrogen pressure of 400 to 1800 pounds per square inch.

Compounds having the formula:

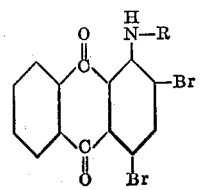

wherein R has the meaning previously assigned to it can be prepared by brominating a compound having the formula:

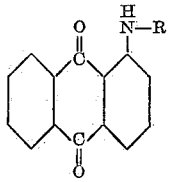

wherein R has the meaning previously assigned to it in accordance with the following procedure for the bromination of 1-methylaminoanthraquinone.

*Preparation of 1-methylamino-2,4-dibromoanthraquinone*

23.7 grams of 1-methylaminoanthraquinone and 21.6 grams of potassium acetate are placed in 200 cc. of glacial acetic acid and the reaction mixture resulting is heated, with stirring, to 60–65° C. 35.5 grams of bromine in 30 cc. of glacial acetic acid are added slowly over a period of 1–2 hours while maintaining a reaction temperature of 60° C.–65° C. The reaction mixture is maintained at 60° C.–65° C. for 3–4 hours and then cooled and filtered. 1-methylamino-2,4-dibromoanthraquinone melting at 162° C.–163° C. is obtained upon crystallizing the product recovered on the filter from glacial acetic acid. A good yield of the product in less pure form can be obtained by pouring the reaction mixture into 3 liters of cold water and filtering. By the use of β-hydroxyethylaminoanthraquinone instead of 1-ethylaminoanthraquinone in the foregoing example, 1-β-hydroxyethylamino-2,4-dibromoanthraquinone melting at 226° C.–229° C. is obtained.

The cellulose carboxylic esters which may be dyed or colored with the anthraquinone compounds of our invention include hydrolyzed as well as unhydrolyzed cellulose acetate, cellulose propionate, cellulose butyrate, cellulose acetate-propionate and cellulose acetate-butyrate. While our new anthraquinone compounds have been illustrated more particularly in connection with the coloration of cellulose acetate, a material to which they are especially adapted, it will be understood that they can be used for the coloration of the other aforesaid cellulose carboxylic esters. Our new compounds are also useful for the coloration of cellulose ester and cellulose ether lacquers as well as lacquers made from polyvinyl compounds and they also possess some utility for the coloration of nylon and textile materials prepared therefrom.

The anthraquinone dyes of our invention can be applied to the coloration of fabrics made of or containing a cellulose carboxylic ester, such as cellulose acetate rayon, by the known dyeing or printing methods. In accordance with the known dispersion method of dyeing, the anthraquinone dyes are first ground to a fine powder, intimately mixed with a suitable dispersing or solubilizing agent, following which the resulting mixture is added to water or a dilute solution of soap in water to form an aqueous dye bath. The textile materials are then immersed in such a dye bath in accordance with known procedures. Suitable dispersing or solubilizing agents include soap, sulforicinoleic acid, the alkali metal salts of sulforicinoleic acid, sulfonated oleic, stearic or palmitic acid or salts thereof, such as the sodium or ammonium salts. For printing, our new dyes are advantageously ground with a suitable dispersing agent, such as a sodium lignin sulfonate and the resulting printing mixture is then applied to the textile materials, in accordance with known printing methods.

In accordance with the recommendations of Chemical Abstracts, the term propylene is intended to mean the group having the following formula:

$$-CH_2-CH-$$
$$\quad\quad\;\; |$$
$$\quad\quad CH_3$$

and the term trimethylene is intended to mean the group having the following formula:

$$-CH_2-CH_2-CH_2-$$

We claim:

1. The anthraquinone compounds having the formula:

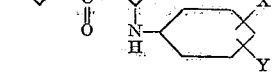

wherein R represents a member selected from the group consisting of a hydrogen atom, an alkyl group having one to four, inclusive, carbon atoms, a hydroxyalkyl group having two to three, inclusive, carbon atoms, an alkoxyalkyl group having three to four, inclusive, carbon atoms, and a hydroxyalkoxyalkyl group having four to six, inclusive, carbon atoms, Y represents a member selected from the group consisting of an $-OR_1-(OR_1)_n-OH$ group and an $$-(OR_2)_m-OR_3$$

group wherein $R_1$ and $R_2$ each represent a member selected from the group consisting of an ethylene group, a propylene group, and a trimethylene group, $R_3$ represents a member selected from the group consisting of a methyl group and an ethyl group, $n$ stands for a whole positive integer of from one to three, inclusive, $m$ stands for a whole positive integer of from two to three, inclusive, and wherein when $n$ is three, $R_1$ is ethylene, and X represents a member selected from the group consisting of a hydrogen atom, a halogen atom, a methyl group, an ethyl group, a hydroxy group, and an acetamino group.

2. The anthraquinone compounds having the formula:

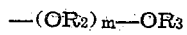—O—CH$_2$CH$_2$-(O—CH$_2$CH$_2$)$_n$—OH wherein $n$ represents a whole positive integer of from one to three, inclusive.

3. The anthraquinone compounds having the formula:

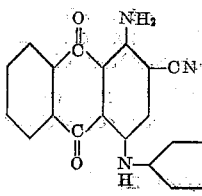—(O—CH$_2$CH$_2$)$_m$—OR$_3$ wherein $m$ represents a whole positive integer of from two to three, inclusive, and $R_3$ stands for a member selected from the group consisting of a methyl group and an ethyl group.

4. The anthraquinone compound having the formula:

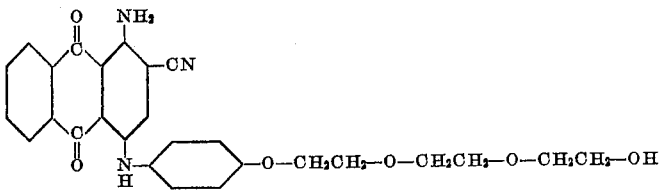

5. The anthraquinone compound having the formula:

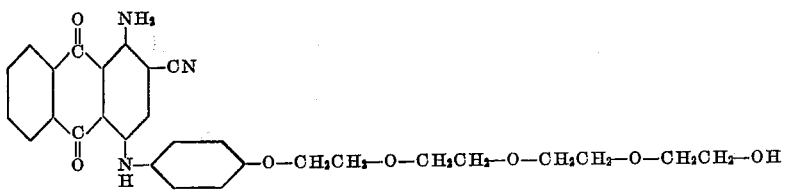

6. The anthraquinone compound having the formula:

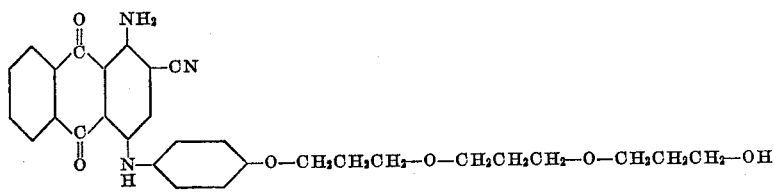

JOSEPH B. DICKEY.
ANTHONY LORIA.

REFERENCES CITED

The following references are of record in the file of this patent:

UNITED STATES PATENTS

| Number | Name | Date |
|---|---|---|
| 1,938,029 | Kugel | Dec. 5, 1933 |
| 2,326,047 | McNally et al. | Aug. 3, 1943 |
| 2,353,108 | Wuertz et al. | July 4, 1944 |
| 2,357,176 | (I) Dickey | Aug. 29, 1944 |
| 2,359,381 | Perkins et al. | Oct. 3, 1944 |
| 2,391,011 | (II) Dickey et al. | Dec. 18, 1945 |
| 2,455,077 | Seymour et al. | July 13, 1948 |

FOREIGN PATENTS

| Number | Country | Date |
|---|---|---|
| 306,963 | Great Britain | May 27, 1930 |